Oct. 25, 1949.                F. HAUSMANN                    2,486,280
                        APPARATUS FOR TESTING FRICTION
Filed June 8, 1944                                        3 Sheets-Sheet 1

Inventor
Frederick Hausmann,
By
Mason, Fenwick & Lawrence,
Attorneys.

Oct. 25, 1949.  F. HAUSMANN  2,486,280
APPARATUS FOR TESTING FRICTION
Filed June 8, 1944  3 Sheets-Sheet 2
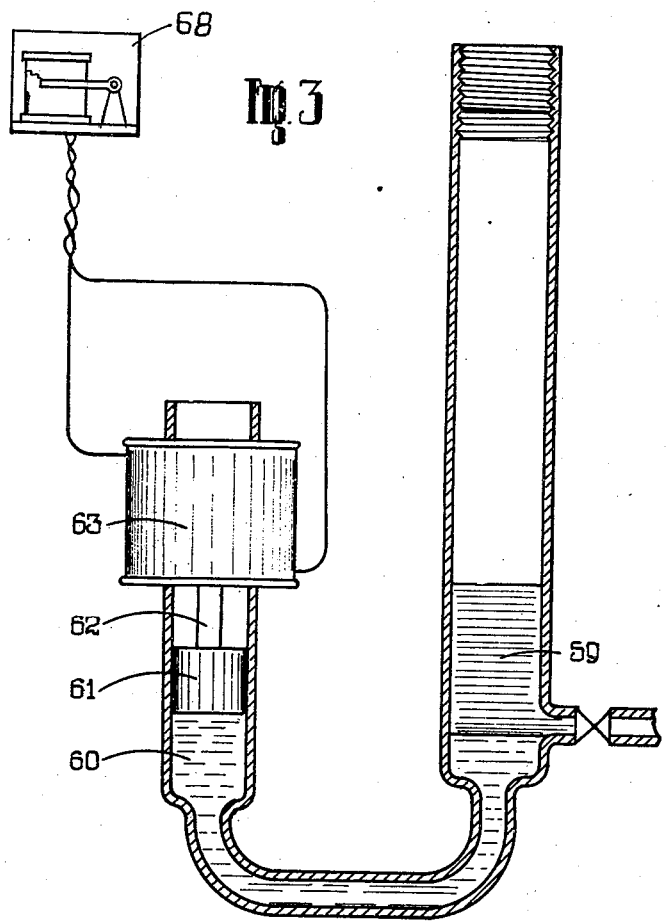
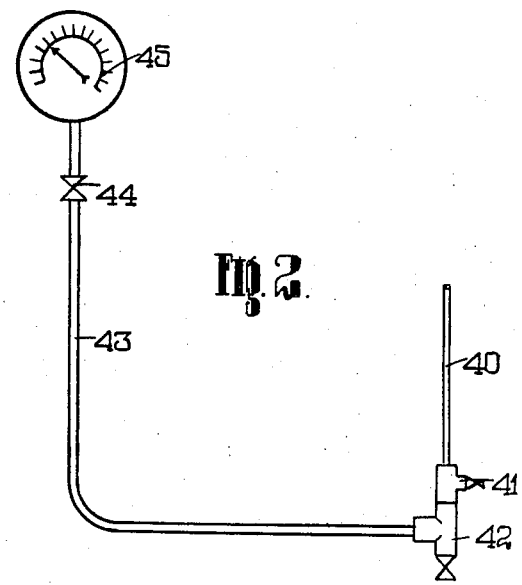
Inventor
Frederick Hausmann,
By
Mason, Kolehmainen & Dillon
Attorneys.

Patented Oct. 25, 1949

2,486,280

UNITED STATES PATENT OFFICE 2,486,280

APPARATUS FOR TESTING FRICTION

Frederick Hausmann, Bolton, England, assignor to William Walker and Sons Limited, Bolton, England, a British company Application June 8, 1944, Serial No. 539,249
In Great Britain November 27, 1942

Section 1, Public Law 690, August 8, 1946
Patent expires November 27, 1962

21 Claims. (Cl. 73—9)

This invention relates to an improved apparatus for making frictional tests of sealing rings made of materials such as metal, synthetic rubber or other fluid-resistant material for use in annular fluid seals.

It is common practice to seal a rotary shaft by a ring of resilient material in the form of an initially flat annulus at right angles to the axis of rotation, the inside of the annulus being bent into engagement with the shaft against which it is compressed by a circular spring. In practice it is found that considerable heat may be generated with consequential wastage of power and in order to select suitable materials for the sealing ring it is desirable to make frictional tests and other measurements thereon.

One object of the invention is to provide means for examining the behaviour of a sealing ring test piece under controlled working conditions.

Another object is to determine the thermal effect of friction in a sealing ring test piece.

A further object is to measure the extent of oil leakage past a test piece under known conditions of oil composition and temperature.

A still further object is to provide an apparatus including a shaft mockup adapted for rotation relative to a sealing ring test piece whereby the useful life of an individual test piece under standardised conditions may be determined together with other data such as the power consumed as friction at various stages in the life of a sealing ring. By the expression "shaft mockup" is meant a body adapted to present for rotation relative to the test piece a cylindrical surface of similar diameter to that of a shaft for which a sealing ring of the same size as the test piece is suitable.

These and other objects will be apparent from the following description, with reference to the accompanying drawings in which:

Figure 2 is a diagram of connections for an oil-drip indicator for use with the apparatus.

Figure 3 shows diagrammatically an alternative arrangement for recording the oil leakage.

Figure 1:
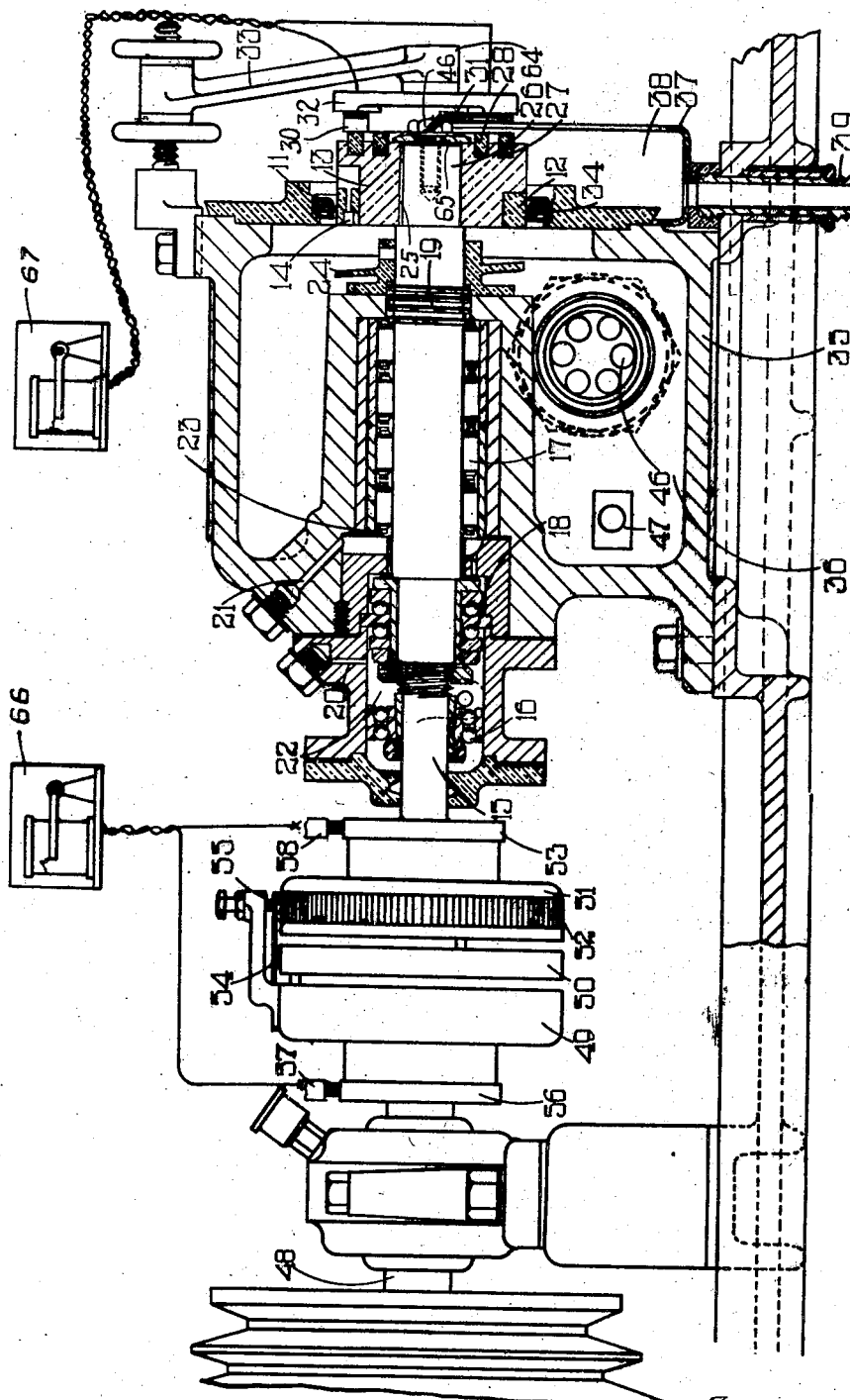
Figure 1 is a vertical side elevation, partly in section showing one arrangement.
Figure 4:
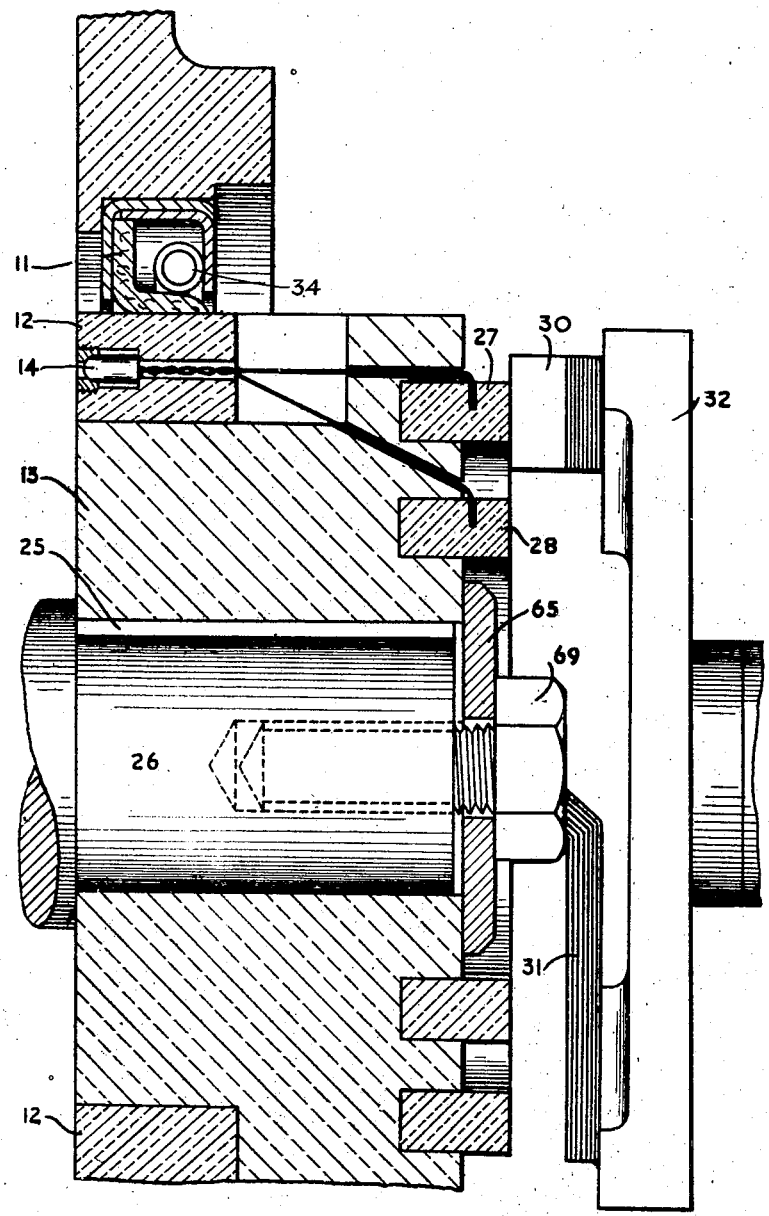
Fig. 4 is a fragmentary detail on an enlarged scale as compared with Fig. 1 illustrating more clearly the construction of the shaft mockup.

A sealing ring test piece 11 is mounted so as to be in contact with a peripheral heat conducting portion 12 affixed to heat insulating portion 13 of a shaft mockup 12, 13, a thermocouple 14 being fitted to measure the temperature obtaining in portion 12.

A drive spindle 15, carried by ball bearing 16 and roller bearing 17 and provided with ball thrust bearing 18 has square oil retaining threads 19 adapted to retain oil or other lubricant supplied through bores 20 or 21 to chambers 22 or 23 in which the ball bearings 16, 18 and roller bearings 17 are respectively disposed.

The drive is transmitted to shaft 15 from shaft 48 by way of a torque meter which comprises a portion 49 mounted on shaft 48 and adapted to transmit power through a spiral spring 50 to portion 51 which is mounted on the end of shaft 15. A rheostatic element 52 is insulatedly mounted on portion 51 of the torque meter one of its ends being brought out to an insulatedly mounted slip ring 53. An arm 54 carries a movable contact element 55 which is connected to slip ring 56. Brushes 57 and 58 cooperate with rings 56 and 53 respectively, and are adapted to be connected to a suitable instrument 66 such as a volt meter in series with a suitable source of E. M. F. which may be calibrated either in terms of torque or power transmitted at a given speed.

A swish plate 24 adapted to project oil against test piece 11 is mounted at end of the spindle 15. Bolt 89 and washer 65 retain the shaft mockup 12, 13 on the reduced portion 26 of the spindle, whilst a key 25 engaged in complementary keyways on said reduced portion 26 and heat insulating portion 13 respectively locks the shaft mockup against rotation relative to the spindle.

Thermocouple 14 is connected by leads, not shown to slip rings 27, 28 partially embedded in, and secured to portion 13 of the shaft mockup.

Cooperating with these slip rings are spring brushes 30, 31 respectively, supported by insulating member 32 attached to adjustable arm 33. The brushes 30, 31 are adapted to be connected to a recording and indicating galvanometer 67 or the like electric indicating or recording instrument.

Springs 34 urge the sealing ring test piece into contact with portion 12 of the shaft mockup.

The main casting 35 includes a chamber 36 into which oil may be introduced through a port (not shown) to a desired level.

A tubular electric heater 46 and thermostatic switch 47 project into the chamber 36.

Sheet metal splash guard 37 forms an oil collection receptacle 38 connected by coupling 39 and pipe 40 (Fig. 2) through adjustment valve 41, draw-off valve 42, pipe 43 and valve coupling 44 to pressure indicator 45.

In operation the apparatus is run for a known time at a given speed and the temperature increase and oil leakage are observed.

The swish plate 24 projects oil against the sealing ring test piece to test out the sealing characteristics of such sealing ring test piece, and ensures that the oil in the chamber is well mixed and thus at a substantially constant temperature throughout.

The oil leakage may alternatively be estimated by using a level indicator, preferably of the electrically operated type.

A suitable type is shown in Fig. 3 wherein the amount of oil in column 59 influences the level of the mercury 60 which in turn raises or lowers the iron piston 61 having an extension 62 projecting into coil 63 and thereby changes the reactance of the coil 63. Coil 63 is adapted to be connected to an instrument 68 which may be an indicating, recording or indicating and recording meter and for example consists of an A. C. ammeter in series with a suitable A. C. source. The said instrument 68 is responsive to reactance in coil 63 or a function thereof and may be calibrated in terms of volume of oil.

I declare that what I claim is:

1. An apparatus for testing sealing rings comprising a shaft mockup having a peripheral heat conductive portion affixed to a portion with a relatively low heat conductivity, means for mounting a sealing ring test piece with its inner periphery in contact with said conductive portion, means for effecting relative rotation between said test piece and said mockup, and means for indicating the temperature of said conductive portion.

2. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, and means for indicating the temperature of said conductive portion.

3. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, a thermocouple carried by said conductive portion and means connected to said thermocouple for indicating the temperature of said conductive portion.

4. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, means actuated by rotation of said mockup for projecting oil against the test piece during rotation of said mockup, means for storing oil and supplying oil to said projecting means, and means for indicating the temperature of said conductive portion.

5. An apparatus for testing sealing rings comprising an independently lubricated shaft, a rotatable shaft mockup mounted on said shaft and having a peripheral heat conductive portion affixed to a portion with a relatively low heat conductivity, means for mounting a sealing ring test piece with its inner periphery in contact with said conductive portion, means actuated by rotation of said mockup for projecting oil against the test piece during rotation of said mockup, means for storing oil and supplying oil to said projecting means, and means for indicating the temperature of said conductive portion.

6. An apparatus for testing sealing rings comprising an independently lubricated shaft, a rotatable shaft mockup mounted on said shaft and having a peripheral heat conductive portion affixed to a portion with a relatively low heat conductivity, means for mounting a sealing ring test piece with its inner periphery in contact with said conductive portion, means containing oil, a switch plate rotatable with said mockup and adapted to dip into said oil for projecting oil against the test piece and means for indicating the temperature of said conductive portion.

7. An apparatus for testing sealing rings comprising a chamber having an end wall provided with an opening; and containing a test liquid such as oil, an independently lubricated shaft rotatable within said chamber, a shaft mockup mounted on said shaft so as to protrude through the opening in said end wall and having a peripheral heat conductive portion affixed to a portion with a relatively low heat conductivity, means for mounting a sealing ring test piece with its inner periphery in contact with said conductive portion and sealing the space between the periphery of said opening and the periphery of said shaft mockup, means rotatable with said mockup for projecting test liquid from said chamber against the test piece, and a thermocouple carried by said conductive portion electrically connected to means for recording the temperature of said portion.

8. An apparatus for testing sealing rings comprising a chamber having an end wall and containing a test liquid such as oil, an independently lubricated shaft rotatable within said chamber, a shaft mockup mounted on said shaft so as to protrude through an opening in said end wall and having a peripheral heat conductive portion affixed to a portion with a relatively low heat conductivity, said heat conductive portion being concentric with said opening, means carried by said end wall for mounting a sealing ring test piece with its inner periphery in contact with said conductive portion to seal said opening means for projecting test liquid from said chamber against the test piece, a thermocouple carried by said conductive portion electrically connected to means for recording the temperature of said portion, and means for collection and estimation of the amount of test liquid leaking past said test piece.

9. An apparatus for testing sealing rings comprising a chamber having an end wall and containing a test liquid such as oil, an independently lubricated shaft rotatable within said chamber, a shaft mockup mounted on said shaft so as to protrude through an opening in said end wall and having a peripheral heat conductive portion affixed to a portion with a relatively low heat conductivity, said heat conductive portion being concentric with said opening, means carried by said end wall for mounting a sealing ring test piece with its inner periphery in contact with said conductive portion to seal said opening, means for projecting test liquid from said chamber against the test piece, a thermocouple carried by said conductive portion electrically connected to means for recording the temperature of said portion, a receptacle for collecting test liquid which leaks out of said chamber past the test piece and pressure responsive means for indicating the level of liquid in said receptacle.

10. An apparatus for testing sealing rings comprising a chamber having an end wall and containing a test liquid such as oil, an independently lubricated shaft rotatable within said chamber, a shaft mockup mounted on said shaft so as to protrude through an opening in said end wall and having a peripheral heat conductive portion affixed to a portion with a relatively low heat conductivity, said heat conductive portion being concentric with said opening, means carried by said end wall for mounting a sealing ring test piece with its inner periphery in contact with said conductive portion to seal said opening, means for projecting test liquid from said chamber against the test piece, a thermocouple carried by said conductive portion electrically connected to means for recording the temperature of said portion, a receptacle for collecting test liquid which leaks out of said chamber past the test piece and electromagnetic means including a coil, means for measuring the reactance of said coil, a float displaceable in accordance with liquid level, and a magnetic core fixed to said float and adapted in its movement to vary the reactance of said coil for indicating the level of liquid in said receptacle.

11. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, means for indicating the torque required to rotate said mockup, and means for indicating the temperature of said conductive portion.

12. An apparatus for testing sealing rings comprising a chamber containing oil and having an opening in one of its walls, a rotatable spindle projecting through said opening, a shaft mockup carried on said spindle in the region of said opening and having a heat conductive portion and a portion of relatively low heat conductivity, means for mounting a sealing ring test piece with its inner periphery in contact with said conductive portion, to seal said opening, means for projecting oil from within said chamber against said test piece, and means for indicating the temperature of said conductive portion.

13. An apparatus for testing sealing rings comprising a chamber containing oil and having an opening in one of its walls, a rotatable spindle projecting through said opening, a shaft mockup carried on said spindle in the region of said opening and having a heat conductive portion and a portion of relatively low heat conductivity, means for mounting a sealing ring test piece with its inner periphery in contact wtih said conductive portion, to seal said opening, means for maintaining a substantially constant and uniform oil temperature through the chamber, means for projecting oil from within said chamber against said test piece, and means for indicating the temperature of said conductive portion.

14. An apparatus for testing sealing rings comprising a chamber containing oil and having an opening in one of its walls, a rotatable spindle projecting through said opening, a shaft mockup carried on said spindle in the region of said opening and having a heat conductive portion and a portion of relatively low heat conductivity, means for mounting a sealing ring test piece with its inner periphery in contact with said conductive portion, to seal said opening, means for projecting oil from within said chamber against said test piece, mockup, and opening, means for measuring the amount of oil leakage past said test piece out of said chamber, and means for measuring the temperature of said conductive portion.

15. An apparatus for testing sealing rings comprising a chamber containing oil and having an opening in one of its walls, a rotatable spindle projecting through said opening, a shaft mockup carried on said spindle in the region of said opening and having a heat conductive portion and a portion of relatively low heat conductivity, means for mounting a sealing ring test piece with its inner periphery in contact with said conductive portion, to seal said opening, means for projecting oil from within said chamber against said test piece, mockup and opening, means for measuring power required to rotate said spindle, and means for indicating the temperature of said conductive portion.

16. An apparatus for testing sealing rings comprising a chamber adapted to contain oil having an opening in one of its walls, a rotatable spindle projecting through said opening, a shaft mockup carried on said spindle in the region of said opening, means for indicating torque required to rotate said spindle, means for mounting a sealing ring test piece with its inner periphery in contact with said shaft mockup, to seal said opening, and means for projecting oil from within said chamber against said test piece, mockup and opening, and means for measuring the amount of oil leakage past said test piece out of said chamber.

17. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, means actuated by rotation of said mockup for projecting oil against the test piece during rotation of said mockup, means for indicating the temperature of said conductive portion, and means for measuring the amount of oil leakage past said test piece.

18. An apparatus for testing sealing rings comprising an independently lubricated shaft, a rotatable shaft mockup mounted on said shaft and having a peripheral heat conductive portion affixed to a portion having a relatively low heat conductivity, means for mounting a sealing ring test piece with its inner periphery in contact with said conductive portion, means actuated by rotation of said mockup for projecting oil against said test piece during rotation of said mockup, means for storing oil and supplying oil to said projecting means, means for indicating the temperature of said conductive portion, and means for measuring the amount of oil leakage past said test piece.

19. An apparatus for testing sealing rings comprising a rotatable shaft mockup having a peripheral heat conductive portion affixed to a portion with a relatively low heat conductivity, means for mounting a sealing ring test piece with its inner periphery in contact with said conductive portion, means actuated by rotation of said mockup for projecting oil against the test piece during rotation of said mockup, a chamber containing oil surrounding said projecting means, and means for indicating the temperature of said conductive portion.

20. An apparatus for testing sealing rings comprising an independently lubricated shaft, a rotatable shaft mockup mounted on said shaft and having a peripheral heat conductive portion affixed to a portion with a relatively low heat conductivity, means for mounting a sealing ring test piece with its inner periphery in contact with said conductive portion, means for projecting oil against the test piece during rotation of said mockup, a chamber containing oil surrounding said projecting means, and means for indicating the temperature of said conductive portion.

21. An apparatus for testing sealing rings comprising an independently lubricated shaft, a rotatable shaft mockup mounted on said shaft and having a peripheral heat conductive portion affixed to a portion having a relatively low heat conductivity, means for mounting a sealing ring test piece with its inner periphery in contact with said conductive portion, means actuated by rotation of said mockup for projecting oil against said test piece during rotation of said mockup, a chamber containing oil surrounding said projecting means, means for indicating the temperature of said conductive portion, and means for measuring the amount of oil leakage past said test piece.

FREDERICK HAUSMANN.

REFERENCES CITED

The following references are of record in the file of this patent:

UNITED STATES PATENTS

| Number | Name | Date |
| --- | --- | --- |
| 1,572,940 | Legg | Feb. 16, 1926 |
| 2,017,425 | Wheeler | Oct. 15, 1935 |
| 2,038,092 | Wheeler | Apr. 21, 1936 |